United States Patent [19]

Ohmae et al.

[11] Patent Number: 5,296,552
[45] Date of Patent: Mar. 22, 1994

[54] ADHESIVE RESIN COMPOSITION

[75] Inventors: Tadayuki Ohmae, Chiba; Yoshiki Toyoshima, Ichihara; Hisao Tanaka, Ichihara; Mitsuyuki Okada, Ichihara; Harunori Fujita, Ichihara, all of Japan

[73] Assignee: Sumitomo Chemical Company, Limited, Osaka, Japan

[21] Appl. No.: 840,805

[22] Filed: Feb. 25, 1992

[30] Foreign Application Priority Data

Feb. 27, 1991 [JP] Japan .................. 3-032697

[51] Int. Cl.$^5$ .............................. C08L 23/26
[52] U.S. Cl. .................... 525/193; 525/197; 525/198; 525/74
[58] Field of Search ........... 525/193, 197, 198, 74

[56] References Cited

U.S. PATENT DOCUMENTS

| 3,868,433 | 2/1975 | Bartz et al. ............. 525/74 |
| 4,735,988 | 4/1988 | Takada et al. ........... 525/75 |
| 4,985,502 | 1/1991 | Izumi et al. ............ 525/193 |

FOREIGN PATENT DOCUMENTS

| 235876 | 9/1987 | European Pat. Off. . |
| 52-32654 | 8/1977 | Japan . |
| 54-40112 | 12/1979 | Japan . |
| 58-034837 | 3/1983 | Japan . |
| 58-222134 | 12/1983 | Japan . |
| 60-11056 | 3/1985 | Japan . |
| 60-36942 | 8/1985 | Japan . |
| 61-4412 | 2/1986 | Japan . |
| 62-15349 | 4/1987 | Japan . |
| 2119389 | 11/1983 | United Kingdom . |

Primary Examiner—Carman J. Seccuro, Jr.
Attorney, Agent, or Firm—Stevens, Davis, Miller & Mosher

[57] ABSTRACT

An adhesive resin composition is obtained by mixing at least one member (C) selected from the group consisting of unsaturated carboxylic acids and the derivatives thereof, a free-radical initiator (D), and a mixture consisting of a crystalline polyolefin resin (A) and an amorphous or low crystalline olefin copolymer of ethylene and an α-olefin (B), to obtain a precursor mixture, melt-kneading the precursor mixture in the first half of an extruder having at least one side feeder, to obtain a modified precursor mixture, and feeding a crystalline polyolefin resin (E) from the side feeder of the extruder and mixing the resin (E) with the modified precursor mixture.

The adhesive resin composition has good extrudability and exhibits high adhesive property to polar materials such as polar polymeric materials and the like.

5 Claims, No Drawings

ADHESIVE RESIN COMPOSITION

FIELD OF THE INVENTION

The present invention relates to an adhesive resin composition which comprises an olefin polymer composition modified with an unsaturated carboxylic acid or its derivative through a specific melt-kneading process and is inexpensive and excellent in adhesion to polar materials such as metals, polar polymeric materials, etc. and in extrudability.

DESCRIPTION OF RELATED ART

As is well known, polyolefins represented by polyethylene and polypropylene have a variety of excellent physical and chemical properties, mechanical properties and procesability and, coupled with their inexpensiveness, are widely used in various fields of industry. However, these polyolefins have a defect in that due to their nonpolarity they are difficultly made up into composite materials with polar materials such as metals, glass, polar polymeric materials, and the like. It is widely known that, in order to remedy the defect, rubbery substances are added to the olefin polymers or the monomers thereof containing a functional group are grafted to or copolymerized with the polymers.

For example, JP-B-61-4412 proposes a method which comprises modifying polyethylene and a rubbery substance. However, such modified resins, when used alone, are expensive and give low adhesive strength, so that they are customarily blended with unmodified polyolefin. With regard to such blending, for example, JP-B-52-32654 proposes a method which comprises using a composition comprising polyethylene and a modified polyethylene having a specific intrinsic viscosity, JP-B-60-11056 proposes a method which comprises using a composition having a specific melt index ratio, and JP-B-54-40112 and JP-B-60-36942 propose a method which comprises adding rubbery substances. JP-A-58-222134 proposes a method which comprises modifying a polyethylene and a rubbery substance and then blending the resulting modified product with a polyolefin.

However, these methods are still unsatisfactory. Though the adhesive strength is increased by these methods, it is insufficient for practical use. Further, since the methods involve complicated process steps the resulting products are of high cost and further are highly liable to be contaminated with impurities during the process steps.

Thus, an object of the present invention is, overcoming the difficulties mentioned above, to provide a resin composition which can be produced through a simple process, is inexpensive and is excellent in adhesive strength to polar materials.

SUMMARY OF THE INVENTION

As described above, the method of melt-diluting a modified resin with an unmodified resin is preferable in respect of the adhesive property and the manufacturing cost of the melt-diluted product. However, since the method comprises two steps of graft reaction step and melt-dilution step, it results in increased manufacturing cost. Additionally, the method has s high possibility for the resulting composition to be contaminated by impurities getting mixed therewith between the two steps. Since these adhesive resins are mainly used in the field of film, even a small amount of impuritiy causes fish eyes or gels, leading to poor film appearance. Therefore, it is preferable to perform the reaction and the dilution in one step to obtain an adhesive resin.

Accordingly, the present inventors have studied a method which comprises providing a side feeder at an intermediate part of an extruder and feeding and mixing a diluting resin therethrough. That is, in this method, the graft reaction is conducted in the first half of the extruder and subsequently the diluting resin is melt-kneaded in the latter half. The problem of the method lies in that, as compared with the two-stage process in which the modification reaction and the melt-blending with unmodified resin are conducted separately, the time allowed for conducting the graft-modification is short and hence the graft reaction efficiency is low.

The present inventors have made extensive study on the kinds and proportions of resins to be reacted and melt-blended in the above mentioned process and also on extruders used. As the result, it has been found that the graft reaction efficiency can be improved by mixing an amorphous or low crystalline olefin copolymer to a crystalline polyolefin resin with increasing the amounts of an unsaturated carboxylic acid or its derivative and of a free-radical initiator added, and subjecting the resulting mixture to a simultaneous modification reaction.

However, it was found that when the amount of an unmodified crystalline polyolefin resin melt-blended in the latter half is increased, the adhesive strength is lowered in spite of the high extent of graft reaction attained.

Accordingly, the present inventors have further made extensive study on the relationship between the properties and the adhesive strength of various resin compositions and the components thereof. As the result, it has been found that the presence of both a component of high rigidity and a component of low rigidity is indispensable for achieving a high adhesive strength and further that an optimum value is present in the rigidity of the adhesive resin composition itself.

It is generally known that the higher the adhesive strength, the larger the energy absorbed in peeling. This energy can be expressed as the product of the stress acting on the peeling point and the deformation. It has been revealed from various studies of the present inventors that a rigidity which is optimum for adhesion exists because when the rigidity of adhesive resin is too low the stress at work is small, whereas when it is too high scarcely no deformation takes place. As to the role of the component of high rigidity and component of low rigidity, it has been revealed that the presence of these components changes the mode of deformation from elastic deformation into plastic one, which further promotes the absorption of peeling energy and makes the peeling more difficult. On the basis of these findings, the present inventors have made further study on the mixing ratio of respective components and other factors. As the result, by increasing the proportion of an amorphous or low crystalline polyolefin resin, which is the component of low rigidity in the graft-modified product, to about half or more, a resin composition having a property meeting the above-mentioned requirements for rigidity, etc. can be obtained even when the amount of unmodified crystalline polyolefin resin component is increased. Determination of the adhesive strength of the resin composition demonstrated that a high adhesive strength developed as expected.

From the study described above, a composition has become obtainable which is satisfactory with respect to adhesive strength and cost. However, since larger amounts of an unsaturated carboxylic acid or its derivative and a radical initiator are used in the composition it gives rise to a new problem of frequent occurrence of gel components and resultant poor appearance. Offensive smells due to unreacted these components and their decomposition products are also unneglectable. Therefore the present inventors have studied using a twin-screw extruder, which can knead stronger and disperse the respective components better than a single-screw extruder. As to the remedial measure for smells, improvement has been attained by keeping the vent port under vacuum to remove volatile components. The use of a twin-screw extruder has also brought about additional advantage of further improved graft efficiency and increased adhesive strength.

From the investigations described above, it has been found that an adhesive resin composition which is excellent in adhesion, gives little of gel component and smell and is of low manufacturing cost can be obtained by using a twin-screw extruder in its production, adding 45% or more of an amorphous or low crystalline olefin copolymer to a crystalline polyolefin resin and using an unsaturated carboxylic acid or its derivative and a free-radical initiator in relatively large amounts. The present invention has been attained on the basis of the above finding.

According to the present invention, there are provided an adhesive resin composition advantageous in adhesive property and film appearance, which composition is obtained by (a) mixing
  (i) 0.01-5 parts by weight of at least one member (C) selected from the group consisting of unsaturated carboxylic acids and the derivatives thereof, and
  (ii) 0.01-2 parts by weight of a free-radical initiator (D), and
  (iii) 100 parts by weight of a mixture consisting of 55-5% by weight of a crystalline polyolefin resin (A) and 45-95% by weight of an amorphous or low crystalline olefin copolymer of ethylene and an α-olefin having at least 3 carbon atoms (B), to obtain a precursor mixture,
(b) melt-kneading the precursor mixture in the first half stage of an extruder having at least one side feeder provided at at least one portion selected from the group consisting of the midway stage of the extruder and the latter half stage of the extruder, to obtain a modified precursor mixture, and
(c) feeding a crystalline polyolefin resin (E) from the at least one side feeder and mixing the resin (E) with the modified precursor mixture so that the ratio of the total weight of the components (A) and (B) to the weight of the component (E) is within the range of from 60:40 to 2:98; and a process for producing an adhesive resin composition which process is economically beneficial in manufacturing cost and of low offensive smell-generating, and comprises the steps of:

(a) mixing
  (i) 0.01-5 parts by weight of at least one member (C) selected from the group consisting of unsaturated carboxylic acids and the derivatives thereof, and
  (ii) 0.01-2 parts by weight of a free-radical initiator (D), and
  (iii) 100 parts by weight of a mixture consisting of 55-5% by weight of a crystalline polyolefin resin (A) and 45-95% by weight of an amorphous or low crystalline olefin copolymer of ethylene and an α-olefin having at least 3 carbon atoms (B), to obtain a precursor mixture,
(b) melt-kneading the precursor mixture in the first half stage of an extruder having at least one side feeder provided at at least one portion selected from the group consisting of the midway stage of the extruder and the latter half stage of the extruder, to obtain a modified precursor mixture, and
(c) feeding a crystalline polyolefin resin (E) from the at least one side feeder and mixing the resin (E) with the modified precursor mixture so that the ratio of the total weight of the components (A) and (B) to the weight of the component (E) is within the range of from 60:40 to 2:98.

DETAILED DESCRIPTION OF THE INVENTION

The crystalline polyolefin resins (A) used in the present invention may be various olefin homopolymers and copolymers including low density polyethylene, high density polyethylene, linear low density polyethylene, crystalline polypropylene, crystalline propylene-ethylene random copolymer, crystalline propylene-ethylene block copolymer, polybutene-1, propylene-butene-1 copolymer, poly-4-methylpentene-1, propylene-4-methylpentene-1 copolymer, and propylene-ethylene-butene-1 terpolymer, and the mixtures of two or more of these polyolefin resins.

Of these, preferably used are ethylene-based polymers which are the copolymers of ethylene and an α-olefin of at least 3 carbon atoms and have an ethylene content of 90% by weight or more. The heat of melting of the crystalline polyolefin resin (A) determined with DSC is not particularly limited but is preferably at least 20 cal/g, more preferably at least 30 cal/g. The flexural modulus determined in accordance with ASTM-D747 also is not particularly restricted but is preferably more than 1,500 kg/cm$^2$, more preferably 2,000 kg/cm$^2$ or more.

The α-olefin in the amorphous or low crystalline olefin copolymer (B) of ethylene and an α-olefin of at least 3 carbon atoms used in the present invention may be, for example, propylene, 1-butene, 1-pentene, 1-hexene, 1-octene, 4-methylpnetene-1, and the like, and also the mixtures thereof. Further, the copolymer (B) may contain a small amount (3% by weight or less) of a non-conjugated diene. The heat of melting, determined with DSC, of the amorphous or low crystalline olefin copolymer (B) which is the component of low rigidity, is not particularly limited but is preferably less than 20 cal/g, more preferably 15 cal/g or less. The flexural modulus determined in accordance with ASTM-D747 also is not particularly restricted but is preferably 1,500 kg/cm$^2$ or less, more preferably 1,000 kg/cm$^2$ or less. Particularly preferably used are ethylene-propylene copolymer rubber and resins of ethylene-1-butene copolymer, ethylene-1-hexene copolymer, ethylene-1-octene copolymer, ethylene-4-methylpentene-1 copolymer, ethylene-propylene-1-butene copolymer, ethylene-1-butene-1-hexene terpolymer, ethylene-1-butene-4-methylpentene-1 terpolymer, etc. which resins have a heat of melting of 15 cal/g or less as determined with DSC.

Examples of the unsaturated carboxylic acid in the component (C) used in the present invention include acrylic acid, methacrylic acid, itaconic acid, citraconic acid, himic acid (bicyclo[2.2.1]hept-5-ene- 2,3-dicarboxylic acid), bicyclo[2.2.2]oct-5-ene-2,3-dicarboxylic acid, 4-methylcyclohex-4-ene-1,2-dicarboxylic acid, 1,2,3,4,5,8,9,10-octahydronaphthalene-2,3-dicarboxylic acid, bicyclo[2.2.1]oct-7-ene-2,3,5,6-tetracarboxylic acid, 7-octabicyclo[2.2.1]hept-5-ene-2,3-dioic acid, etc.

The derivatives of unsaturated carboxylic acids in the component (C) may be acid anhydrides, esters, amides, imides and metal salts. Specific examples thereof are maleic anhydride, itaconic anhydride, citraconic anhydride, himic anhydride (bicyclo[2.2.1]hept-5-ene-2,3-dicarboxylic acid anhydride), monoethyl maleate, monoethyl fumarate, monomethyl itaconate, monomethyl fumarate, dimethylaminopropylacrylamide, acrylamide, methacrylamide, maleic acid monoamide, maleic acid diamide, maleic acid N-monoethylamide, maleic acid N,N-diethylamide, maleic acid N-monobutylamide, maleic acid N,N-dibutylamide, fumaric acid monoamide, fumaric acid diamide, fumaric acid N-monoethylamide, fumaric acid N,N-diethylamide, fumaric acid N-monobutylamide, fumaric acid N,N-dibutylamide, maleimide, N-butylmaleimide, N-phenylmaleimide, sodium acrylate, sodium methacrylate, potassium acrylate, potassium methacrylate, glycidyl acrylate, glycidyl methacrylate, etc. These unsaturated carboxylic acids or their derivatives may also be used as a mixture of two or more thereof. Of these, maleic anhydride is most preferably used.

The free-radical initiator (D) used in the present invention may be those known to the art. Specific examples thereof are azo compounds such as 2,2'-azobisisobutyronitrile, 2,2'-azobis(2,4,4-trimethylvaleronitrile) etc.; and various organic peroxides such as methyl ethyl ketone peroxide, cyclohexanone peroxide, 3,5,5-trimethylcyclohexanone peroxide, 2,2-bis(t-butylperoxy)butane, t-butyl hydroperoxide, cumene hydroperoxide, diisopropylbenzene hydroperoxide, 2,5-dimethylhexane-2,5-dihydroperoxide, di-t-butyl peroxide, 1,3-bis(t-butylperoxyisopropyl)benzene, 2,5-dimethyl-2,5-di(t-butylperoxy)hexane, lauroyl peroxide, 3,5,5-trimethylhexanoyl peroxide, benzoyl peroxide, t-butyl peracetate, t-butyl peroxydiisobutyrate, t-butyl peroxypivalate, t-butyl peroxy-2-ethylhexanoate, t-butyl peroxy-3,5,5-trimethylhexanoate, t-butyl peroxylaurate, t-butyl peroxybenzoate, di-t-butyl peroxyisophthalate, 2,5-dimethyl-di(benzoylperoxy)hexane, t-butyl peroxyisopropylcarbonate, polystyrene peroxide, etc.

The crystalline polyolefin resin (E) used in the present invention may be, besides the crystalline polyolefin resin (A) mentioned above, at least one polymer selected from crystalline copolymers of ethylene and any one of vinyl acetate, acrylic acid, methacrylic acid, and their esters such as methyl acrylate, methyl methacrylate, ethyl acrylate, ethyl methacrylate, butyl acrylate, butyl methacrylate, glycidyl acrylate, glycidyl methacrylate, etc.

In the adhesive resin composition of the present invention, the amounts of respective components to be incorporated are as follows. The amount of the crystalline polyolefin resin (A) is 55–5% by weight, preferably 55–10% by weight, more preferably 55–25% by weight. The amount of the amorphous or low crystalline olefin copolymer (B) of ethylene and an α-olefin of at least 3 carbon atoms is 45–95% by weight, preferably 45–90% by weight, more preferably 45–75% by weight. On the basis of 100 parts by weight of a mixture consisting of the components (A) and (B) described above, the amount of the component (C) is 0.01–5 parts by weight, preferably 0.1–3 parts by weight, more preferably 0.6–2 parts by weight, and that of the free-radical initiator (D) is 0.01–2 parts by weight, preferably 0.03–1 part by weight, more preferably 0.06–1 part by weight. The ratio of the total weight of the components (A) and (B) to the weight of the crystalline polyolefin resin (E) ranges 60–2:40–98, preferably 50–5:50–95, more preferably 40–10:60–90.

When the amount of the component (B) is less than 45% by weight, a satisfactory modification effect cannot be obtained unless the amount of the component (E) is decreased. On the other hand, when the amount of the component (B) exceeds 95% by weight the mechanical property is deteriorated. When the amount of the component (C) added is less than 0.01 part by weight, no substantial modification effect is obtained. On the other hand, when the amount of the component (C) exceeds 5 parts by weight, the modification effect levels off and a more marked effect cannot be obtained any longer; moreover, much of the component will remain unreacted in the resulting resin composition, which causes disadvantages in practical use, including offensive odor, lowering of adhesion, corrosion of processing machines, etc. When the amount of the component (D) added is less than 0.01 part by weight, the graft efficiency of the component (C) is low and much of the component (C) remains unreacted in the resin composition, which is unfavorable in practice. When the amount of the component (D) exceeds 2 parts by weight, a more marked effect on the graft efficiency of the component (C) cannot be obtained any longer; moreover it leads to a higher extent of decomposition or crosslinkage of the crystalline polyolefin resin (A) and a large variation of flowability, i.e. melt flow rate, which is disadvantageous in practice. When the amount of the component (E) is less than 40% by weight per the total weight of the components (A) and (B), it gives rise to bad results also with regard to smells and fish eyes, and will also deteriorate the antiblocking property and solvent resistance of the film formed from the resulting resin composition. When the amount of the component (E) exceeds 98% by weight per the total weight of the component (A) and (B), the adhesive strength is lowered.

The adhesive resin composition preferably has a heat of melting of 10–30 cal/g as determined with DSC, though it is not particularly limited. The composition desirably has a flexural modulus determined according to ASTM-D747 in the range of preferably 500–2,500 $kg/cm^2$, more preferably 500–2,000 $kg/cm^2$, though it is not particularly limited.

The process for producing the adhesive resin composition of the present invention will be described specifically as follows. A mixture of the crystalline polyolefin resin (A), the amorphous or low crystalline olefin copolymer of ethylene and an α-olefin having at least 3 carbon atoms (B), at least one member (C) selected from the group consisting of unsaturated carboxylic acids and the derivatives thereof and the free-radical initiator (D) is melt-kneaded in the first half stage of an extruder at a temperature of 150°–300° C., preferably 190°–280° C., for a retention time of 0.1–10 min, preferably 0.2–5 min. The crystalline polyolefin resin (E) is mixed thereinto through at least one side feeder provided at at least one portion selected from the group consisting of the midway stage of the extruder and the latter half stage of the extruder. The extruder is preferably a twin-screw one, as described above. Twin-screw extruders may be classified into two types, the same-directional rotation type and the different-directional rotation type, according to the direction of screw rotation, and into the engaging type, non-engaging type and intermediate type according to the degree of contact between the screws. Further, the extent of kneading can be changed by means of the screw pattern. These factors may be selected as desired. However, when the kneading is too strong, the temperature of the resin will exceed the temperature limit specified above owing to heat generation by shearing, promoting crosslinking reaction and causing fish eyes and other troubles.

The components (A), (B), (C) and (D) may also be fed in divisions by using at least one side feeder provided at the portion of the first half stage of the extruder, while keeping the intended mixing ratio. The feed from the at least one side feeder may be in the form of solid or liquid or the intermediate state thereof. Various types of side feeders can be used, preferred of which are single-screw or twin-screw extruders.

It is advantageous to perform the production while removing the unreacted components (C) and (D) and the side reaction products such as oligomers and decomposition products of the components by keeping the vent port part under vacuum. Though the reaction may be conducted in an atmosphere of air, it is desirably conducted in an atmosphere of inert gases such as nitrogen and carbon dioxide. For the purpose of further removing minute amounts of the unreacted components and the side reaction products contained in the adhesive resin composition obtained, the composition may be subjected to a heat treatment at a temperature of 40° C. or more, solvent extraction or suction under vacuum in the molten state.

The adhesive resin composition of the present invention may be incorporated, when necessary and desired, with various additives, such as antioxidants, heat stabilizers, light stabilizers, nucleating agents, lubricants, antistatic agents, inorganic or organic fillers, inorganic or organic coloring agents, rust preventives, crosslinking agents, foaming agents, plasticizers, fluorescent brightners, surface smoothening agents, surface gloss improving agents, etc., during the production steps or in the subsequent processing steps. Further, since the modification reaction can be completed in a shorter time by use of the technique of the present invention, it has become possible to produce an adhesive resin composition with a combination of two extruders in which a side extruder of short retention time is used. This system has the advantage of being able to use an extruder of the size which matches with the amounts of resin to be modified and diluting resin, though it is somewhat disadvantageous in viewpoints of running cost and installation space.

The adhesive composition comprising the modified polyolefin of the present invention thus obtained can be adhered strongly to various polar materials. By using the adhesive resin composition of the present invention and using conventional processing techniques, various composite materials, such as coverings, laminates, reinforced resins, etc., which are excellent in adhesion, can be prepared. For laminates, for example, powder coating such as fluidized bed coating, electrostatic coating, flame spray coating, etc.; solution coating, extrusion coating, coextrusion, dry lamination, hot pressing, insert molding, etc. and further the combination of these may be used in accordance with intended objects. Further, filler-reinforced resins, fiber-reinforced resins, and the like can be produced by extrusion molding, injection molding, or such.

The present invention will be described in more detail below with reference to Examples, but the invention should not be interpreted to be limited thereto.

The properties shown in Examples were determined by the following methods.

(1) Melt Flow Rate (MFR)

Determined according to JIS K6760.

(2) Flexural Modulus

Determined according to ASTM-D747.

(3) Amount of Bound Maleic Anhydride

The amount of bound maleic anhydride in the adhesive resin composition was determined as follows. A small amount of sample was dissolved in hot xylene and then precipitated with anhydrous acetone. The sample thus purified was again made into a xylene solution and then titrated, while being kept warm, with a NaOH methanol solution by using phenolphthalein as an indicator. The amount of bound maleic anhydride was calculated from the result of titration.

(4) Ethylene Content

A press sheet was prepared and subjected to infrared absorption spectrometry. The ethylene content was obtained from the absorbance, corrected for thickness, of the characteristic absorption of methyl ($-CH_3$) appearing in the vicinity of 1378 $cm^{-1}$ in the spectrum thus obtained, by using the calibration curve method.

(5) Heat of Melting Determined with Differential Scanning Calorimeter (DSC)

The calorimeter used was DSC-4 (a trade name, mfd. by Perkin-Elmer Corp.).

A sheet about 0.5 mm in thickness was prepared by hot pressing, from which a test piece weighing about 10 mg was cut out. The test piece was placed in a sample pan for DSC determination, and pre-molten in DSC at 150° C. for 5 min. Then the temperature was decreased at the rate of 5° C./min down to 50° C., kept at the level for 5 min and then increased at the rate of 5° C./min up to 200° C. Thus, a thermogram was obtained, from which the quantity of heat (cal) absorbed per 1 g of sample was determined.

(6) Adhesive Strength

A sheet of overlappingly adhered films was cut along the machine direction in 15 mm width to give a test piece. One end of the adhered part of the test piece was peeled apart beforehand and the both ends thus developed by peeling were put between the grips of a tensile tester. The two peeled ends of the test piece were drawn at a velocity of 200 mm/min on the tensile tester and the strength at which T-peeling took place was determined.

EXAMPLE 1

A high density polyethylene (HDPE) having a melt flow rate of 25 g/10 min, a density of 0.958 g/cm³, a flexural rigidity of 9,900 kg/cm² and a heat of melting of 47 cal/g was used as the crystalline polyolefin resin (A). An ethylene-propylene copolymer rubber (EPR) having a melt flow rate of 5 g/10 min, a flexural modulus of 90 kg/cm$^2$ and a heat of melting of 0 was used as the amorphous or low crystalline olefin copolymer (B). Maleic anhydride (MAH) was used as the component (C). t-Butyl peroxylaurate (TBPL) [Perbutyl (a registered trade mark) L, mfd. by Nippon Oil & Fats Co., Ltd.] was used as the free-radical initiator (D). Fifty percent by weight of the high density polyethylene, 50% by weight of the ethylene-propylene copolymer rubber, 0.7 part by weight of maleic anhydride and 0.07 part by weight of t-butyl peroxylaurate were mixed uniformly in a Henschel Mixer. The mixture was then melt-kneaded in the first half of a twin-screw extruder of 30 mm bore diameter (TEX 30, a trade name, mfd. by The Japan Steel Works) having a side feeder at an intermediate position, to effect graft modification. Subsequently a low density polyethylene (LDPE) made by high pressure process having a melt flow rate of 7 g/10 min, density of 0.918 g/cm$^3$, flexural modulus of 1,800 kg/cm$^2$ and heat of melting of 23 cal/g, used as the crystalline polyolefin resin (E), was fed through the side feeder and mixed with the graft-modified mixture. The amount of the component (E) added was 70% by weight and the total amount of the components (A) and (B) was 30% by weight. Melt-kneading was performed at a temperature of 200° C. for an average retention time of 1.0 min, whereby an adhesive resin composition was obtained. The amount of bound maleic anhydride in the resin composition was 0.06% by weight. The adhesive resin composition was formed into a film of two layers of two different resins by means of coextrusion, with an ethylene-vinyl alcohol copolymer (EVOH) [Eval (a registered trade mark) EP-F, mfd. by Kuraray Co., Ltd.] used as the adherend. The processing temperature was 230° C., processing speed 15 m/min, die width 250 mm and the thickness of each layer 0.025 mm. The adhesive strength between the two resins determined by T-peeling method was 210 g/15 mm width. The results of the test are shown in Table 1.

EXAMPLE 2

The same procedures as in Example 1 were repeated except for changing the weight ratio of the crystalline polyolefin resin (A) to the amorphous or low crystalline olefin copolymer (B) to 20:80. The results obtained are shown in Table 1.

COMPARATIVE EXAMPLE 1

The same procedures as in Example 1 were repeated except that the crystalline polyolefin resin (A) was not used. The results obtained are shown in Table 1.

COMPARATIVE EXAMPLE 2

The same procedures as in Example 1 were repeated except that the amorphous or low crystalline olefin copolymer (B) was not used. The results obtained are shown in Table 1.

COMPARATIVE EXAMPLE 3

The same procedures as in Example 1 were repeated except that the weight ratio of the crystalline polyolefin resin (A) to the amorphous or low crystalline olefin copolymer (B) was changed to 80:20. The results thus obtained are shown in Table 1.

COMPARATIVE EXAMPLE 4

The same procedures as in Comparative Example 3 were repeated except that the amount of maleic anhydride (C) was changed to 0.4 part by weight and that of the free-radical initiator (D) to 0.04 part by weight. The results thus obtained are shown in Table 1.

EXAMPLE 3

The same procedures as in Example 1 were repeated except that the amount of the crystalline polyolefin resin (E) mixed was changed to 50% by weight and the total amount of the components (A) and (B) was changed to 50% by weight. The results thus obtained are shown in Table 1.

COMPARATIVE EXAMPLE 5

The same procedures as in Comparative Example 3 were repeated except that the amount of the crystalline polyolefin resin (E) mixed was changed to 50% by weight and the total amount of the components (A) and (B) was changed to 50% by weight. The results thus obtained are shown in Table 1.

COMPARATIVE EXAMPLE 6

The same procedures as in Example 1 were repeated except that the amount of the free-radical initiator (D) was changed to 0.005 part by weight. The results thus obtained are shown in Table 1.

EXAMPLES 4 AND 5

The same procedures as in Example 1 were repeated except that the low-density polyethylene used as the crystalline polyolefin resin (E) was replaced by a linear low density polyethylene (LLDPE-1) having an ethylene content of 94% by weight, a 1-butene content of 6% by weight, a melt flow rate of 2 g/10 min, a density of 0.919 g/cm$^3$, a flexural modulus of 2,000 kg/cm$^2$ and a heat of melting of 24 cal/g or an ethylene-vinyl acetate copolymer (EVA) having a vinyl acetate content of 10% by weight, a melt flow rate of 6 g/10 min, a flexural modulus of 750 kg/cm$^2$ and a heat of melting of 16 cal/g. The results thus obtained are shown in Table 1.

EXAMPLE 6

The same procedures as in Example 2 were repeated except that a linear low density polyethylene (LLDPE-A) having an ethylene content of 97% by weight, a 1-butene content of 3% by weight, a melt flow rate of 20 g/10 min, a density of 0.935 g/cm$^3$, a flexural modulus of 4,200 kg/cm$^2$ and a heat of melting of 37 cal/g was used as the crystalline polyolefin resin (A) in place of HDPE, and a linear very low density polyethylene (VLDPE) having a melt flow rate of 2 g/10 min, a density of 0.900 g/cm$^3$, a flexural modulus of 650 kg/cm$^2$ and a heat of melting of 10 cal/g was used as the crystalline polyolefin resin (E) in place of LDPE. The results thus obtained are shown in Table 1.

EXAMPLES 7 AND 8

The same procedures as in Example 1 were repeated except that a polyamide (PA) (CM1021, a trade name, mfd. by Toray Industries, Inc.) or a copolyamide (coPA) (5033B, a trade name, mfd. by Ube Industries, Ltd.) was used as the adherend in place of EVOH. The results thus obtained are shown in Table 1.

EXAMPLE 9

The same procedures as in Example 1 were repeated except that LLDPE-A was used as the crystalline polyolefin resin (A) in place of HDPE. The results thus obtained are shown in Table 1.

COMPARATIVE EXAMPLE 7

The same procedures as in Example 1 were repeated except that the crystalline polyolefin resin (A) was mixed from the side feeder (hereinafter abbreviated as SDF). The results thus obtained are shown in Table 1.

COMPARATIVE EXAMPLE 8

As set forth above, the adhesive resin composition according to the present invention can be produced through a simple process and at a low production cost, contains little of gel components which causes fish eyes and is excellent in adhesion to polar materials. According to the present invention, an adhesive resin composition can be provided which has never been obtainable by the prior art.

TABLE 1

|  |  |  | Example 1 | Example 2 | Comparative Example 1 | Comparative Example 2 | Comparative Example 3 | Comparative Example 4 |
|---|---|---|---|---|---|---|---|---|
| Graft-modified Resin | A*1) | HDPE | 50 | 20 | — | 100 | 80 | 80 |
|  |  | LLDPE-A | — | — | — | — | — | — |
|  | B*1) | EPR | 50 | 80 | 100 | — | 20 | 20 |
|  |  | VLDPE | — | — | — | — | — | — |
|  | C*2) | MAH | 0.7 | 0.7 | 0.7 | 0.7 | 0.7 | 0.4 |
|  | D*2) | TBPL | 0.07 | 0.07 | 0.07 | 0.07 | 0.07 | 0.04 |
|  |  | A + B*3) | 30 | 30 | 30 | 30 | 30 | 30 |
| Unmodified Resin | E*3) | LDPE | 70 | 70 | 70 | 70 | 70 | 70 |
|  |  | LLDPE-1 | — | — | — | — | — | — |
|  |  | VLDPE | — | — | — | — | — | — |
|  |  | EVA | — | — | — | — | — | — |
| Adherend |  |  | EVOH | EVOH | EVOH | EVOH | EVOH | EVOH |
| Adhesive strength (g/15 mm width) |  |  | 210 | 240 | 110 | 40 | 60 | 60 |
| Flexural Modulus (kg/cm$^2$) |  |  | 1700 | 1100 | 700 | 3900 | 2800 | 2800 |
| Heat of Melting (cal/g) |  |  | 23 | 19 | 16 | 32 | 27 | 27 |

|  |  |  | Example 3 | Comparative Example 5 | Comparative Example 6 | Example 4 | Example 5 | Example 6 |
|---|---|---|---|---|---|---|---|---|
| Graft-modified Resin | A*1) | HDPE | 50 | 80 | 50 | 50 | 50 | — |
|  |  | LLDPE-A | — | — | — | — | — | 20 |
|  | B*1) | EPR | 50 | 20 | 50 | 50 | 50 | 80 |
|  |  | VLDPE | — | — | — | — | — | — |
|  | C*2) | MAH | 0.7 | 0.7 | 0.7 | 0.7 | 0.7 | 0.7 |
|  | D*2) | TBPL | 0.07 | 0.07 | 0.005 | 0.07 | 0.07 | 0.07 |
|  |  | A + B*3) | 50 | 50 | 30 | 30 | 30 | 30 |
| Unmodified Resin | E*3) | LDPE | 50 | 50 | 70 | — | — | — |
|  |  | LLDPE-1 | — | — | — | 70 | — | — |
|  |  | VLDPE | — | — | — | — | — | 70 |
|  |  | EVA | — | — | — | — | 70 | — |
| Adherend |  |  | EVOH | EVOH | EVOH | EVOH | EVOH | EVOH |
| Adhesive strength (g/15 mm width) |  |  | 320 | 70 | 40 | 320 | 220 | 125 |
| Flexural Modulus (kg/cm$^2$) |  |  | 1700 | 2900 | 1800 | 1800 | 1100 | 450 |
| Heat of Melting (cal/g) |  |  | 23 | 27 | 23 | 24 | 14 | 9 |

|  |  |  | Example 7 | Example 8 | Example 9 | Comparative Example 7 | Comparative Example 8 | Example 10 |
|---|---|---|---|---|---|---|---|---|
| Graft-modified Resin | A*1) | HDPE | 50 | 50 | — | 50(SDF) | 50 | — |
|  |  | LLDPE-A | — | — | 50 | — | — | 30 |
|  | B*1) | EPR | 50 | 50 | 50 | 50 | 50(SDF) | — |
|  |  | VLDPE | — | — | — | — | — | 70 |
|  | C*2) | MAH | 0.7 | 0.7 | 0.7 | 0.7 | 0.7 | 0.7 |
|  | D*2) | TBPL | 0.07 | 0.07 | 0.07 | 0.07 | 0.07 | 0.07 |
|  |  | A + B*3) | 30 | 30 | 30 | 30 | 30 | 30 |
| Unmodified Resin | E*3) | LDPE | 70 | 70 | 70 | 70 | 70 | 70 |
|  |  | LLDPE-1 | — | — | — | — | — | — |
|  |  | VLDPE | — | — | — | — | — | — |
|  |  | EVA | — | — | — | — | — | — |
| Adherend |  |  | PA | coPA | EVOH | EVOH | EVOH | EVOH |
| Adhesive strength (g/15 mm width) |  |  | 360 | 350 | 250 | 170 | 150 | 260 |
| Flexural Modulus (kg/cm$^2$) |  |  | 1700 | 1700 | 1300 | 1700 | 1700 | 1900 |
| Heat of Melting (cal/g) |  |  | 23 | 23 | 22 | 16 | 23 | 20 |

Notes:
*1)% by weight (A + B = 100)
*2)parts by weight per 100 parts by weight of (A + B)
*3)% by weight (A + B + E = 100)

The same procedures as in Example 1 were repeated except that the amorphous or low crystalline olefin copolymer (B) was mixed from the side feeder (SDF). The results thus obtained are shown in Table 1.

EXAMPLE 10

The same procedures as in Example 9 were repeated except that VLDPE was used as the amorphous or low crystalline olefin copolymer (B) in place of EPR and the weight ratio of LLDPE-A to VLDPE was changed to 30:70. The results thus obtained are shown in Table 1.

What is claimed is:

1. An adhesive resin composition consisting essentially of
a mixture of at least one crystalline polyolefin resin (A) selected from the group consisting of low density polyethylene, high density polyethylene and copolymers of ethylene and an α-olefin of at least 3 carbon atoms and have an ethylene content of 90% by weight or more, and 45-95% by weight of an amorphous or low crystalline olefin copolymer of ethylene and an α-olefin having at least 3 carbon atoms (B), maleic anhydride, and at least one crystalline polyolefin resin (E) selected from the group consisting of low density polyethylene, high density polyethylene, linear low density polyethylene, copolymers of ethylene and any one of vinyl acetate, acrylic acid and their esters and obtained by (a) mixing
  (i) 0.01-5 parts by weight of maleic anhydride,
  (ii) 0.01-2 parts by weight of a free-radical initiator (D), and
  (iii) 100 parts by weight of a mixture consisting of 55-5% by weight of a crystalline polyolefin resin (A) selected from the group consisting of low density polyethylene, high density polyethylene, and copolymers of ethylene and an α-olefin of at least 3 carbon atoms which copolymers have an ethylene content of 90% by weight or more and 45-95% by weight of an amorphous or low crystalline olefin copolymer of ethylene and an α-olefin having at least 3 carbon atoms (B),
to obtain a precursor mixture, (b) melt-kneading the precursor mixture in the first half stage of a twin-screw extruder having at least one side feeder provided at at least one portion of said extruder, the location of said one side feeder being selected from the group consisting of the midway stage of the extruder and the latter half stage of the extruder, to obtain a modified precursor mixture, and (c) feeding a crystalline polyolefin resin (E) selected from the group consisting of low density polyethylene, high density polyethylene, linear low density polyethylene, and copolymers of ethylene and any one of vinyl acetate, acrylic acid and their esters from the at least one side feeder of the extruder and mixing the resin (E) with the modified precursor mixture so that the ratio of the total weight of the components (A) and (B) to the weight of the component (E) is within the range of from 60:40 to 2:98.

2. The composition of claim 1, wherein the crystalline polyolefin resin (A) is a copolymer of ethylene and an α-olefin of at least 3 carbon atoms which copolymer has an ethylene content of at least 90% by weight.

3. The composition of claim 1, wherein the amorphous or low crystalline olefin copolymer (B) has a flexural modulus, determined in accordance with ASTM-D747, of not more than 1,500 kg/cm$^2$.

4. The composition of claim 1, which has a flexural modulus, determined in accordance with ASTM-D747, between 500 kg/cm$^2$ and 2,500 kg/cm$^2$ inclusive.

5. The composition of claim 1, wherein the at least one side feeder is a single-screw or twin-screw extruder.

* * * * *